United States Patent
Zhang et al.

(10) Patent No.: US 7,625,254 B2
(45) Date of Patent: Dec. 1, 2009

(54) BATTERY CONNECTOR WITH A BLOCK PORTION DEFINED A CURVED SURFACE

(75) Inventors: Han-Ming Zhang, ShenZhen (CN); Nan Hu, ShenZhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 12/228,985

(22) Filed: Aug. 18, 2008

(65) Prior Publication Data

US 2009/0047846 A1 Feb. 19, 2009

(30) Foreign Application Priority Data

Aug. 17, 2007 (CN) .................. 2007 2 0042939 U

(51) Int. Cl.
*H01R 4/48* (2006.01)
(52) U.S. Cl. .................. 439/862; 439/733.1; 439/500
(58) Field of Classification Search .......... 439/862, 439/500, 733.1
See application file for complete search history.

(56) References Cited

U.S. PATENT DOCUMENTS

| 5,092,783 | A  | * | 3/1992  | Suarez et al. | 439/862 |
| 5,259,769 | A  | * | 11/1993 | Cruise et al. | 439/862 |
| 6,113,440 | A  | * | 9/2000  | Fijten et al. | 439/862 |
| 6,302,727 | B1 | * | 10/2001 | Fedorjaka     | 439/500 |
| 6,361,359 | B1 | * | 3/2002  | Du et al.     | 439/500 |
| 6,568,955 | B2 | * | 5/2003  | Hotea et al.  | 439/862 |
| 2007/0059976 | A1 | * | 3/2007 | Yeh et al.   | 439/500 |

\* cited by examiner

*Primary Examiner*—Tho D Ta
(74) *Attorney, Agent, or Firm*—Ming Chieh Chang; Wei Te Chung; Andrew C. Cheng

(57) ABSTRACT

A battery connector comprising: an insulative housing; a plurality of passageways defined in the insulative housing; a plurality of contacts received in the passageways; each contact including a retention section, an engaging section bending and extending from an end of the retention section, and a resilient section extending from the other end of the retention portion with a contact portion defined thereon, the contact portion having a block portion; wherein the cross section of the block portion showing cambered and extending against the contact portion.

10 Claims, 4 Drawing Sheets

BATTERY CONNECTOR WITH A BLOCK PORTION DEFINED A CURVED SURFACE

BACKGROUND OF THE INVENTION

1. Field of the Invention

The present invention relates to a battery connector, more particularly to a battery connector for use with a handset of a telephone or a portable electrical device.

2. Description of Prior Arts

In an electrical device, such as a cell phone, it generally includes a battery apartment in which a batter connector is mounted for empowering the operation of the cell phone by a battery installed therein.

The FIG. 4 discloses a conventional battery connector 100', comprising an insulative housing 1' with passageways 11' defined in it, and a plurality of contacts 2' received in the passageways 11'. The said contact 2' including a retention section 20', an engaging section 21' which bending and extending from one end of the retention section 20', and a resilient section 22' which extending from the other end of the retention section 20', a contact portion 23' which having a block portion 24' on the free end is defined on the resilient section 22', the block portion 24' hold the upper surface of the groove 111' of the passageway 11' through the prepressing between the block portion 24' and the upper surface.

An outside force is needed to exert on the contact portion 23' of the contact 2' when the battery connector 100 is put into use, the battery assembly contacting with contact portion 23' close to build up an electrical connection under the outside force. The block potion 24' is formed by stamping and it's easy to leave some burr on the stamping surface after stamping. The block portion 24' can be held on the upper surface of the groove 111' by the prepressing in the assembling process, so the burr would make some of the contacts 2' locate at different positions in the passageways 11', and also, in the moving process of the block potion 24', the process of compression joint may not be smooth.

Hence, an improved battery connector is desired to overcome the disadvantages and problems of the prior art.

SUMMARY OF THE INVENTION

Accordingly, it is an object of the present invention to provide a battery connector in order to make the assembly process more smooth.

In order to achieve the above mentioned objects, a battery connector in accordance with a preferred embodiment of the present invention comprising: an insulative housing; a plurality of passageways defined in the insulative housing; a plurality of contacts received in the passageways; each contact including a retention section, an engaging section bending and extending from an end of the retention section, and a resilient section extending from the other end of the retention portion with a contact portion defined thereon, the contact portion having a block portion; wherein the cross section of the block portion showing cambered and extending against the contact portion. The design of the cambered cross section of the block portion which extending against the contact portion is helpful to make the assembly process more smooth, and it is helpful to prevent the contacts locating at different positions in the passageways.

Other objects, advantages and novel features of the invention will become more apparent from the following detailed description of the present embodiment when taken in conjunction with the accompanying drawings.

BRIEF DESCRIPTION OF THE DRAWING

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE INVENTION

Figure 1:
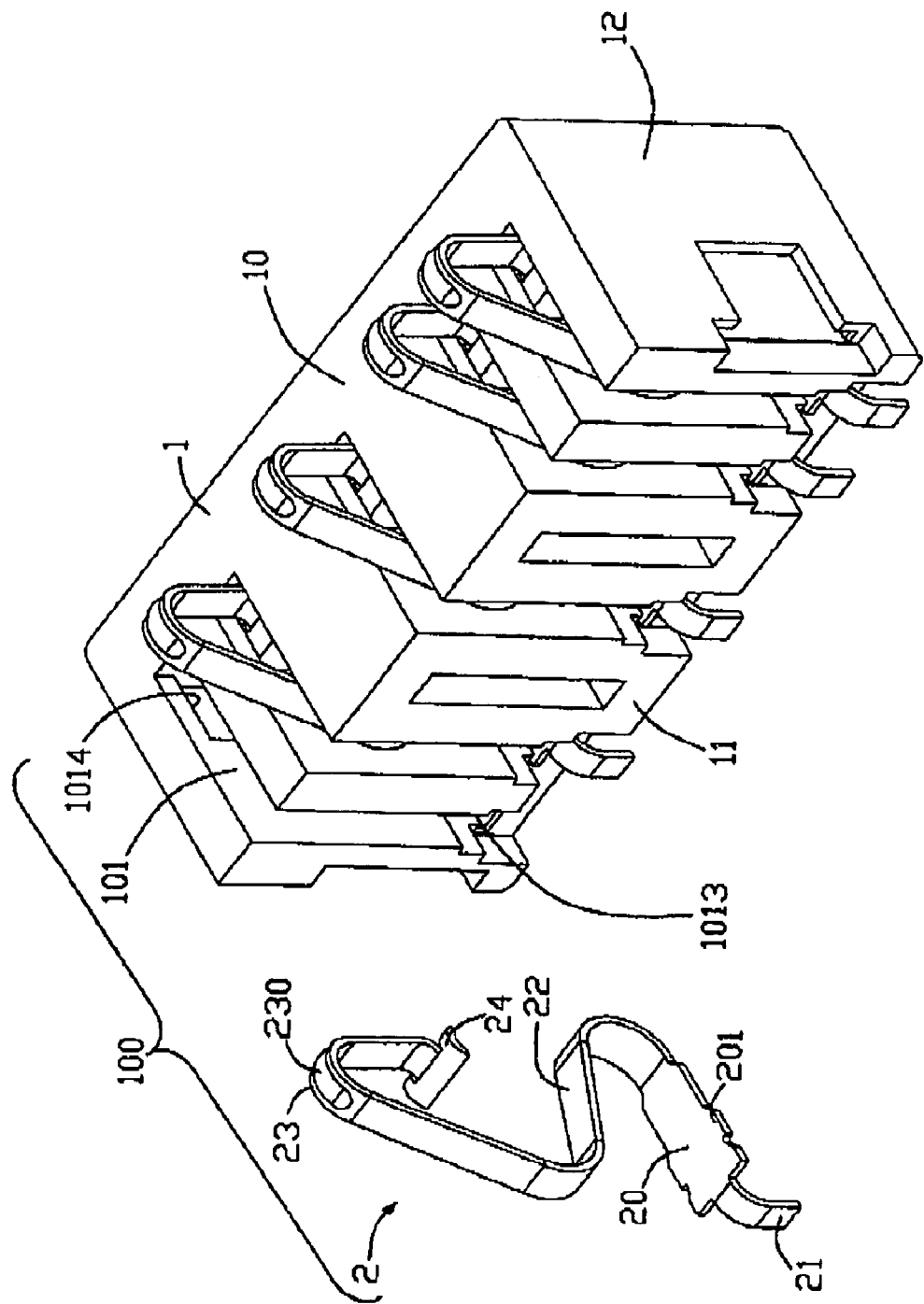
FIG. 1 is a perspective view of the present invention.

While the invention may be embodied in different forms, there is shown in the drawings, and herein will be described in detail, specific embodiments with the understanding that the present disclosure is to be considered an exemplification of the principles of the invention, and is not intended to limit the invention to that as illustrated and described herein.

Figure 2:
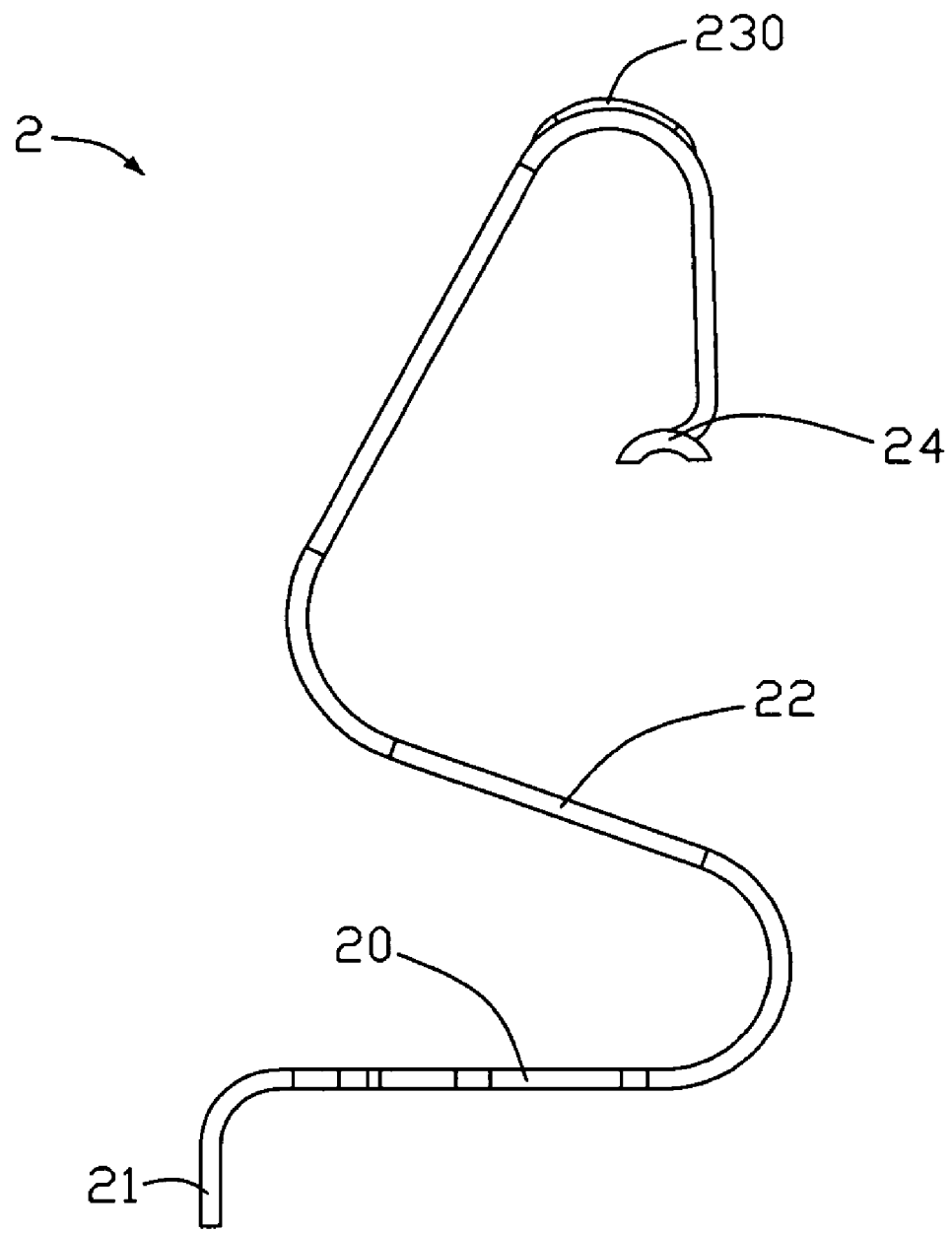
FIG. 2 is a side elevational view of a contact of the battery connector shown in FIG. 1.
Figure 3:
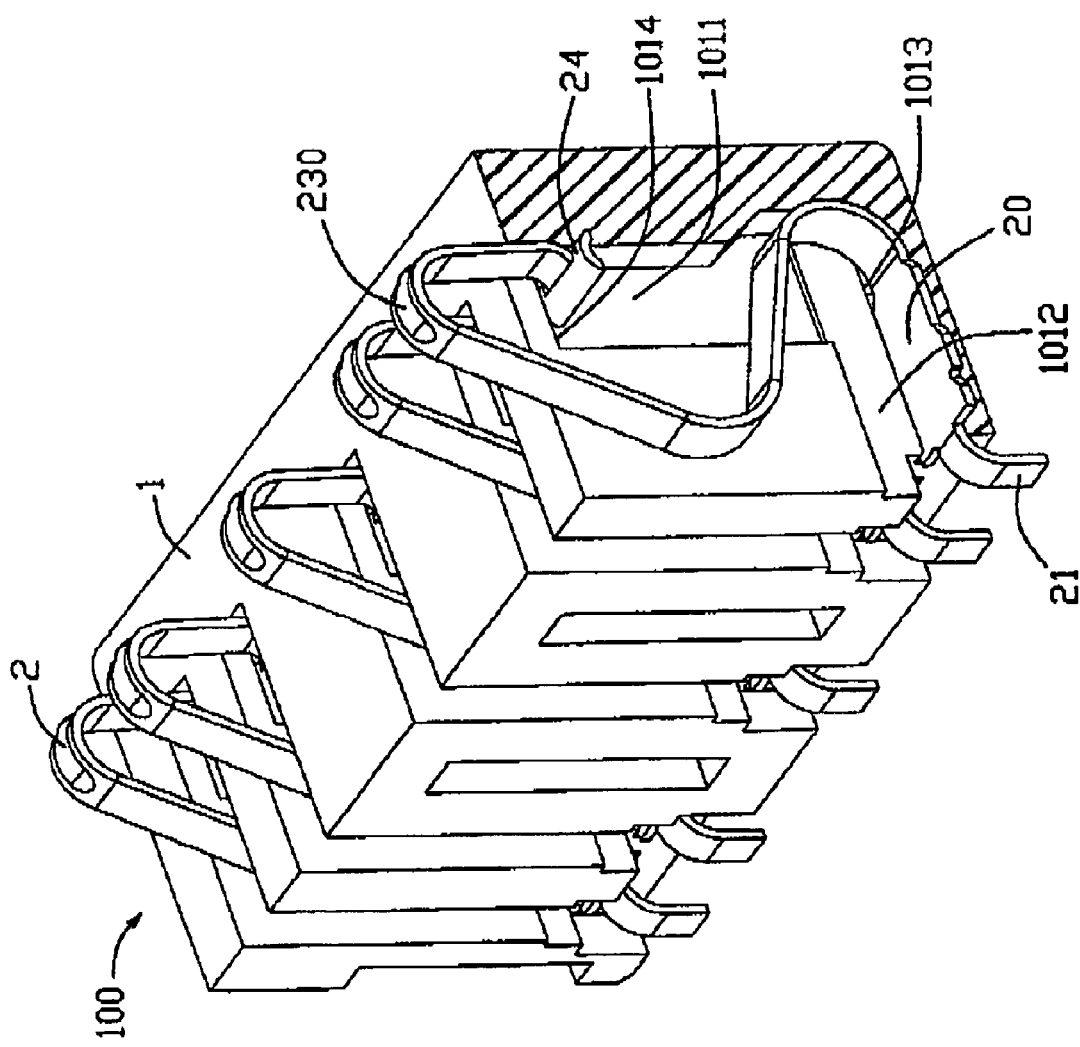
FIG. 3 is a solid coverage of the battery connector shown in FIG. 1, the insulative housing is slivered partly.
Figure 4:
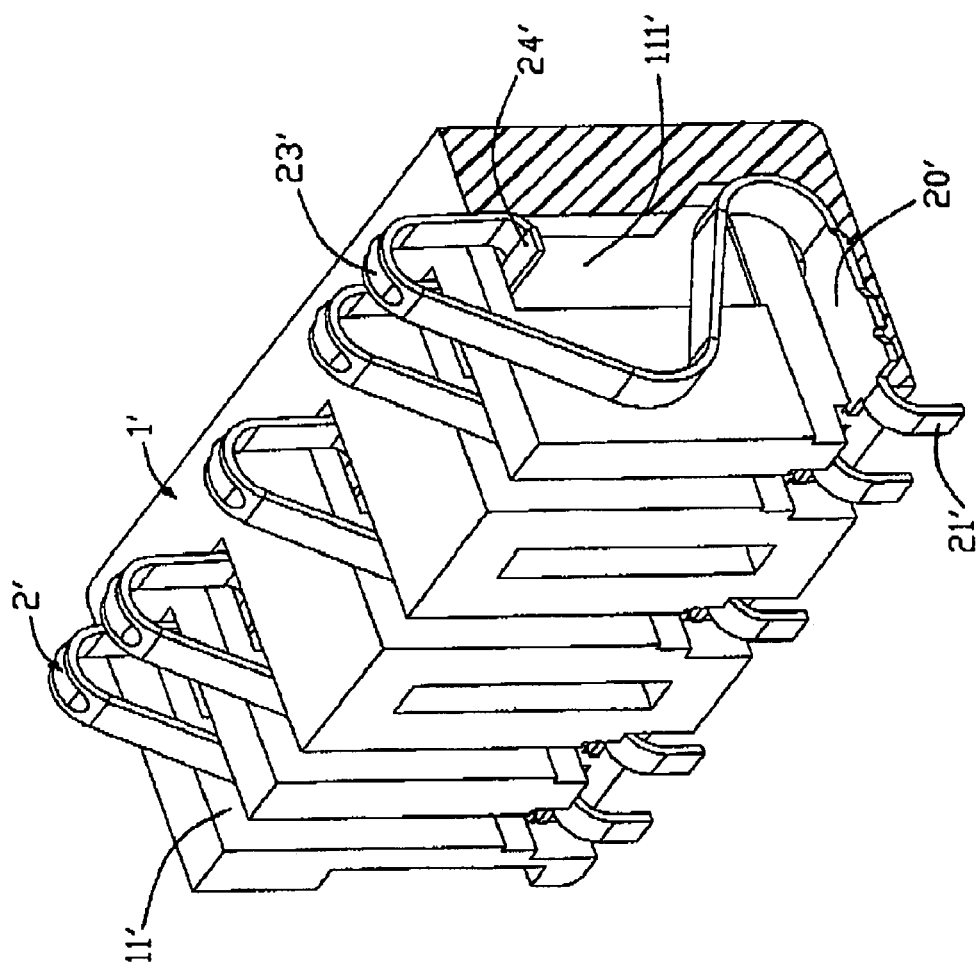
FIG. 4 is a solid coverage of the prior art, the insulative housing is slivered partly.

Referring to the FIG. 1 to FIG. 3, the present invention provides a battery connector 100 assembling to a printed circuit board of a cell phone for electrically mating to a corresponding joint, electrically connecting to a battery in the cell phone. The battery connector 100 includes an insulative housing 1 with a plurality of passageways 101, a plurality of contacts 2 received in the passageways 101.

The insulative housing 1 is a cube, including a top wall 10, two sidewalls 12 and a front wall 11, a plurality of passageways 101 are defined on the insulative housing 1 sidebyside, each passageway lot running through the front wall 11 and the top wall 10, and the back end of the inner sidewall of each passageway 101 defining an upper step structure 1011. A middle step structure 1012 is defined in the passageway 101 which extends rearwardly from the front wall 11 under the upper step structure 1011. A lower horizontal retention groove 1013 is defined in the passageway 101 extending rearwardly from the front wall 11. An upper downward step face 1014 is defined in the upper step structure 1011.

Each contact 2 including a retention section 20, an engaging section 21 which bending and extending from an end of the retention section 20, and a resilient section 22 extending from the other end of the retention section 20. The said retention section 20 having the shape of a flat plate, a plurality of stab portions 201 are set on the two sides of the retention section 20 to fix the contacts 2 in the insulative housing 1. The said resilient section 22 is S-shaped, a contact portion 23 extending from the free end of the resilient section 22, the contact portion 23 is C-shaped, and a rib 230 which is cambered is defined on the vertex of the contact portion 23 to connect with the printed circuit board. The contact portion 23 having a block portion 24 on the free end.

The cross section of the said block portion 24 is a circular section. Wherein the length of the block portion 24 is greater than the width of the contact portion 23. The two ends of the block portion 24 lock the upper surface of the upper step structure 1011 by prepressing.

The battery assembly pressing the contact portion 23 and keeping a good touch with the contact 2 through elasticity. The design of the cambered cross section of the block portion 24, and the block portion 24 extending against the contact portion 23 is helpful to make the assembly process more smooth, and it is helpful to prevent the contacts 2 locating at different positions in the passageways 101. During assembling the block portion 24 first moves along the middle step structure 1012 and successively on the upper step structure 1011 once the retention section 20 moves along the retention groove 1013.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What we claim is:

1. A battery connector comprising:
   an insulative housing with a plurality of passageways defined therein;
   a plurality of contacts received in the passageways;
   each contact including a retention section, an engaging portion extending downwardly from an end of the retention portion; a resilient portion extending upwardly from an opposite end of the retention portion with a contact portion above a top face of the housing; a block portion defined on the contact portion to extend laterally from a free end of the contact portion; a curved surface defined on the block portion to project toward the contact portion wherein in a side view the curved surface defines a middle portion linked to the free end of the contact portion with thereof two end portions downwardly bowed.

2. The battery connector of claim 1, wherein the said retention section having the shape of a flat plate with a plurality of stab portion defined thereon.

3. The battery connector of claim 1, wherein the contact portion is C-shaped with a rib set thereon.

4. The battery connector of claim 1, wherein each contact is approximately S-shaped.

5. The battery connector of claim 1, wherein the block portion retaining in the passageway.

6. The battery connector of claim 1, wherein the length of the block portion is greater than the width of the contact portion.

7. The battery connector of claim 1, wherein the contact portion extends above the passageways.

8. A battery connector comprising:
   an insulative housing defining an upper face and a front face adjacent to each other;
   a plurality of passageways defined in the housing, each of said passageway being open to an upper face and a front face thereof and including a lower horizontal retention groove extending rearwardly from the front face, a middle step structure extending rearwardly from the front face, and an upper step structure spaced from the front face with an upper downward step face thereon;
   a plurality of contacts disposed in the corresponding passageways, respectively, each of said contacts including a horizontal retention section to be retainably received in the horizontal groove, and a curved contact portion extending upwardly from the retention section and with a contact point above the upper face; and
   a block section being formed at a free end of the contact portion and extending laterally on both sides of the contact portion under a condition that during assembling said block section first moves along the middle step structure of the passageway and successively along the upper step structure of the passageway once the retention section moves along the retention groove, wherein in a side view the block section defines a middle portion with thereof two end portions downwardly bowed so that only the middle portion engages the upper downward step face due to resiliency of the curved contact portion while said two end portions not.

9. The battery connector of claim 8, wherein the middle portion of the block section is linked to the free end of the contact portion.

10. The battery connector of claim 9, wherein said block section is joined with said freed end of the contact portion in a split manner on two lateral sides.

* * * * *